United States Patent
Chen (10) Patent No.: US 10,622,758 B2
(45) Date of Patent: Apr. 14, 2020

(54) POWER ADAPTER

(71) Applicant: Delta Electronics (Shanghai) Co., Ltd., Shanghai (CN)

(72) Inventor: Xiaojun Chen, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 16/009,198

(22) Filed: Jun. 15, 2018

(65) Prior Publication Data

US 2019/0245301 A1 Aug. 8, 2019

(30) Foreign Application Priority Data

Feb. 8, 2018 (CN) .......................... 2018 1 0130677

(51) Int. Cl.
| | |
|---|---|
| *H01R 13/502* | (2006.01) |
| *H01R 13/625* | (2006.01) |
| *H01R 31/06* | (2006.01) |
| *H01R 13/424* | (2006.01) |
| *H01R 13/66* | (2006.01) |
| *H01R 24/76* | (2011.01) |
| *H02J 7/00* | (2006.01) |

(52) U.S. Cl.
CPC ......... *H01R 13/625* (2013.01); *H01R 13/424* (2013.01); *H01R 13/6675* (2013.01); *H01R 24/76* (2013.01); *H01R 31/065* (2013.01); *H02J 7/00* (2013.01)

(58) Field of Classification Search
CPC .......................... H01R 13/625; H01R 13/424; H01R 13/6675; H01R 24/76; H01R 31/065

USPC ......................................... 439/701, 731, 906
See application file for complete search history.

(56) References Cited

U.S. PATENT DOCUMENTS

| | | | | |
|---|---|---|---|---|
| 6,927,335 B2* | 8/2005 | Lim | ....................... | H02G 3/081 174/50 |
| 7,563,992 B2* | 7/2009 | Lawlyes | ................ | H05K 5/062 174/561 |
| 8,052,001 B2* | 11/2011 | Chen | ...................... | H05K 5/066 220/4.02 |
| 8,933,349 B2* | 1/2015 | Takahashi | ............ | H05K 5/0013 174/561 |

(Continued)

FOREIGN PATENT DOCUMENTS

| | | |
|---|---|---|
| CN | 203883662 U | 10/2014 |
| CN | 204303598 U | 4/2015 |
| CN | 204928549 U | 12/2015 |

(Continued)

OTHER PUBLICATIONS

Corresponding Taiwan office action dated Apr. 23, 2019.
Corresponding Chinese office action dated Dec. 2, 2019.
Corresponding Taiwan office action dated Dec. 26, 2019.

*Primary Examiner* — Khiem M Nguyen
(74) *Attorney, Agent, or Firm* — CKC & Partners Co., LLC (57) ABSTRACT

The present disclosure provides a power adapter, which includes a cover and electronic components. The cover includes an upper casing, which is provided with a protruding part on an inner sidewall thereof, and a lower casing, which fits with the upper casing to form an accommodating chamber. The sidewalls of the lower casing and the protruding part are fitted and then connected together, and the electronic components are disposed in the accommodating chamber.

16 Claims, 5 Drawing Sheets

(56) References Cited

U.S. PATENT DOCUMENTS 10,375,846 B2 *  8/2019  I
2008/0278045 A1 * 11/2008  Fan .................. H05K 5/066
                                                    312/223.6

FOREIGN PATENT DOCUMENTS

| CN | 105827098 A | 8/2016 |
| CN | 106505496 A | 3/2017 |
| TW | M279959 U | 11/2005 |
| TW | M472869 U | 2/2014 |

* cited by examiner

POWER ADAPTER

CROSS-REFERENCE TO RELATED APPLICATIONS

This application claims priority to Chinese Patent Application No. 201810130677.5, filed on Feb. 8, 2018, the entire contents of which are hereby incorporated by reference.

TECHNICAL FIELD

The present disclosure relates to a power adapter.

BACKGROUND

The statements in this section merely provide background information related to the present disclosure and do not necessarily constitute prior art.

Power adapters, as power conversion apparatus for power supplies of electronic devices, are on the developmental trend towards smaller size, higher density and higher power. Therefore, it is desirable to achieve higher space utilization, so as to realize higher power density in a smaller volume, which, in the meantime, requires better heat dissipation to improve product performance and user experience.

Figure 1:
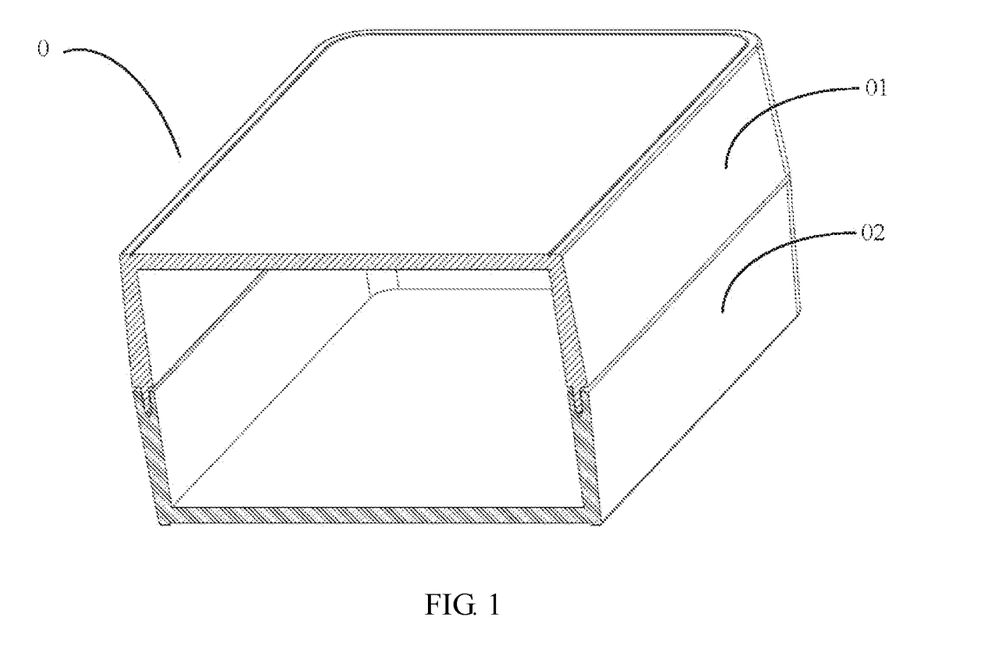
FIG. 1 is a schematic structural view of a conventional power adapter.

A conventional power adapter, as shown in FIG. 1, has a cover 0 that includes an upper casing 01 and a lower casing 02. A rib is provided on a sidewall of the upper casing 01, which is thinner than a thickness of the sidewall. A groove is provided on a sidewall of the lower casing 02 for accommodating the rib. When assembling the casing 0, the sidewall's edge of the upper casing 01 is butt-joined with the sidewall's edge of the lower casing 02, so that the rib can be inserted into the groove. Then, the two casings are connected together at where the rib is fitted to the groove, completing the assembly of the cover.

Figure 2:
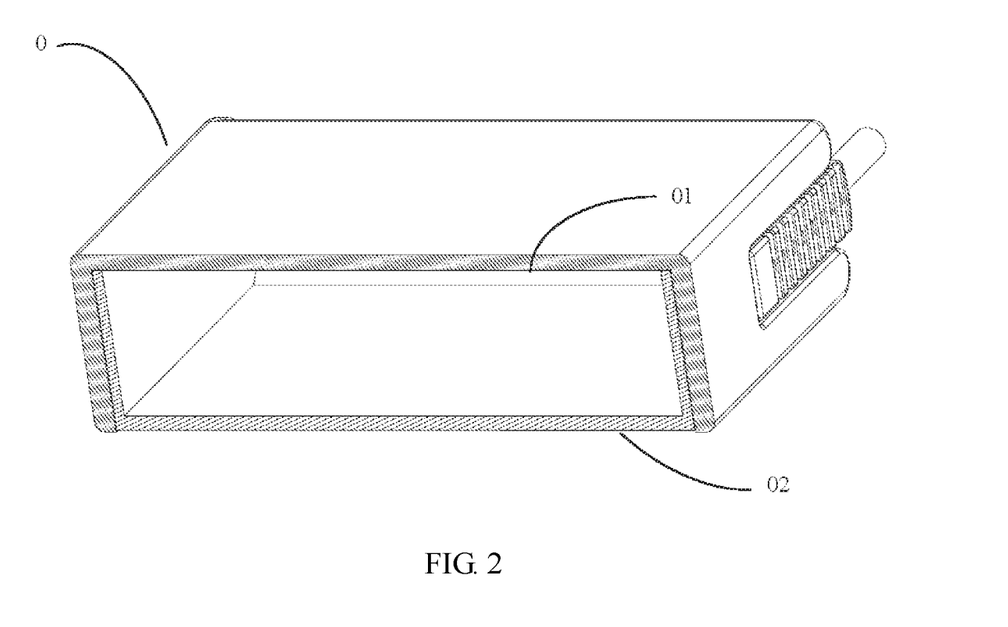
FIG. 2 is a schematic structural view of another conventional power adapter.

Another conventional power adapter, as shown in FIG. 2, has a cover 0 that includes an upper casing 01, and a lower casing 02 that fits with the upper casing 01. When assembling the cover 0, the lower casing 02 is fitted with and inserted into the upper casing 01, and then the two casings are connected together at where two sidewalls of the casings fit, completing the assembly of the cover.

However, with the above methods for assembling the power adapter cover, thickness of the sidewall of the cover may increase due to considerations such as the joining process and the reliability of the assembly. The increased thickness may occupy a large space inside the power adapter, which is undesirable when arranging the internal electronic components of the power adapter, and suffers low space utilization. In addition, the thicker sidewalls will have greater thermal resistance, which is not conducive for dissipating heat from the power adapter. Therefore, there is an urgent need to develop a power adapter that can overcome the above drawbacks.

SUMMARY

A power adapter in accordance with some embodiments includes a cover and electronic components. The cover includes an upper casing, where an inner sidewall of the upper casing is provided with a protruding part on an inner sidewall thereof, and a lower casing, fitting with the upper casing to form an accommodating chamber. The sidewalls of the lower casing and the protruding part are fitted and then connected together, and the electronic components are disposed in the accommodating chamber.

DETAILED DESCRIPTION

The technical solutions of the embodiments of the present disclosure are described clearly and completely in conjunction with the accompanying drawings as follows. Apparently, the described drawings are merely a part of rather than all of the embodiments according to the disclosure. Any and all other embodiments obtained by persons of ordinary skill in the art based on the presently disclosed embodiments without making any creative effort shall fall into the protection scope of the present disclosure.

Embodiment 1

Figure 3:
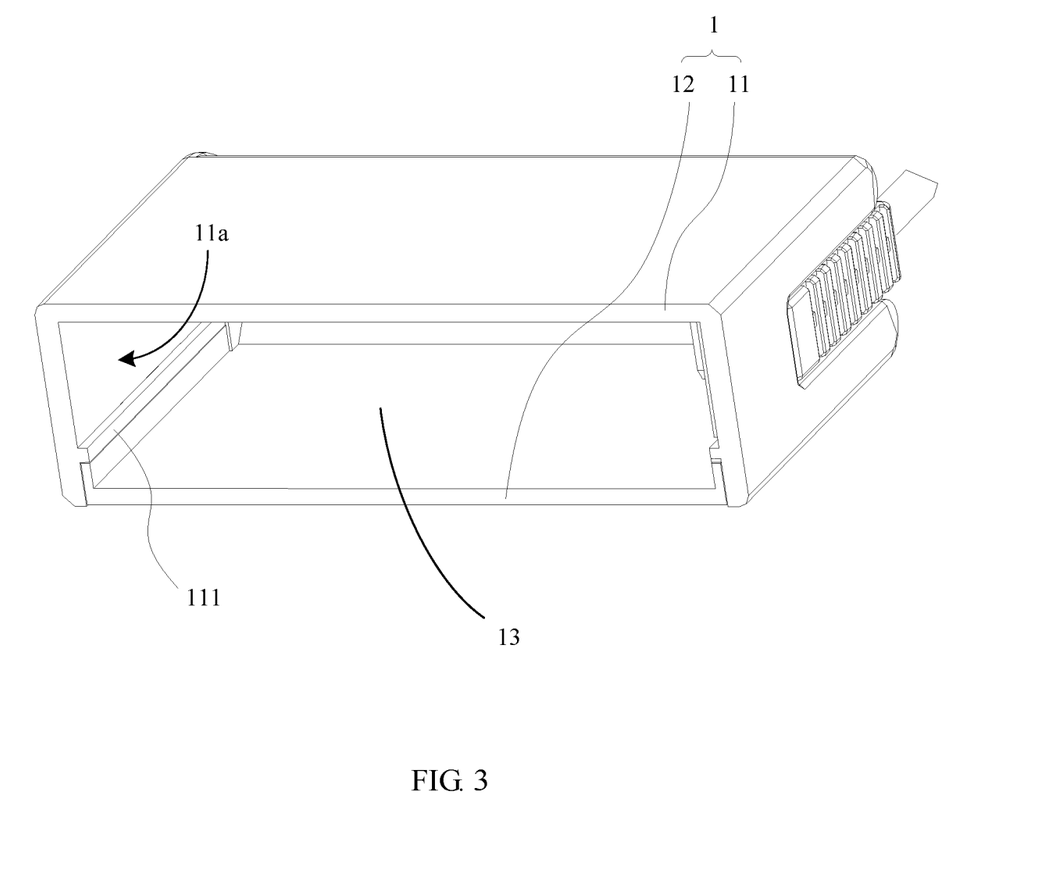
FIG. 3 is a schematic structural view of a power adapter according to Embodiment 1 of the present disclosure.

FIG. 3 is a schematic structural view of a power adapter according to Embodiment 1 of the present disclosure. As shown in FIG. 3, the power adapter provided in this embodiment includes a cover 1 and electronic components (not shown). The cover 1 includes an upper casing 11, and a protruding part 111 disposed on an inner sidewall 11a of the upper casing 11. The cover 1 further includes a lower casing 12, which is fitted to the upper casing 11 to form an accommodating chamber 13. A sidewall of the lower casing 12 is fitted to the protrusion part 111 and then welded together by ultrasonic wave. Accordingly, the electronic components are disposed within the accommodating chamber 13 formed by the upper casing 11 and the lower casing 12.

Specifically, the cover 1 is generally a hollow structure. Both the upper casing 11 and the lower casing 12 are hollow shell-like structures with one side open, so that the openings of the upper casing 11 and the lower casing 12 can be joined with each other to form a sealed accommodating chamber 13 in which the electronic components are disposed, so that the electronic components can enjoy protection and sealing from the upper and lower casings, thereby avoiding undesirable effects from external force or environment and ensuring normal and reliable operation.

In order to seal the upper casing 11 and the lower casing 12, ultrasonic welding may be applied. Frictional heat is generated at the joint between the two casings by using the high-frequency vibration wave, and then the two casings are welded instantaneously, creating not only a tight bonding between the upper casing 11 and the lower casing 12, but also a good structural strength at the welding seam.

In order to facilitate the ultrasonic welding, at least one of the upper casing 11 and the lower casing 12 is made of plastic material. The plastic has the advantages of lower melting point and certain plasticity, which can ensure the smooth welding of the upper casing 11 and the lower casing 12 during the ultrasonic welding. Other than this, the upper casing 11 or the lower casing 12 may also be made of other cover materials commonly used by those skilled in the art, which will not be elaborated herein.

For the ultrasonic welding, a structure is provided between the upper casing 11 and the lower casing 12 for facilitating mutual fitting and positioning. Specifically, a protruding part 111 is provided on the inner sidewall 11a of the upper casing 11. One end of the protruding part 111 is connected to the inner sidewall 11a of the upper casing 11, and the other end of the protruding part 111 protrudes into the chamber of the upper casing 11, serving as a positioning and fitting reference for the butt-joint with lower casing 12. The sidewall of the lower casing 12 abuts against the lower surface of the protruding part 111. At this point, the sidewall of the lower casing 12 is simultaneously positioned and restrained by the protruding part 111 and the inner sidewall 11a of the upper casing 11. After the positioning and pre-assembly of the upper casing 11 and the lower casing 12 in the cover 1 are completed, the joint area between the upper casing 11 and the lower casing 12 can be welded by ultrasonic wave, forming a integrated one-piece structure of the upper and lower casings. The electronic components located inside the cover with one-piece structure may have sufficient protection from the sealed cover. In this way, the thickness of the sidewall of the upper casing 11 can be made thinner, so as to save the internal space of the cover 1 and ensure the arrangement and placement of the electronic components with a certain external dimension of the cover 1, thereby reducing thermal resistance of the cover and improving heat dissipation capability Further, the protruding part 111 may have various structures and forms. For example, in a possible implementation, the protruding part 111 extends in a horizontal direction perpendicular to the inner sidewall 11a of the upper casing 11. Thus, the protruding part 111 may be, or nearly be, perpendicular to the sidewalls of both the upper and lower casings, enabling the protruding part 111 to provide a horizontally disposed abutment surface to the sidewall of the lower casing 12 when this sidewall is fitted to, and abuts against, the protruding part 111. The horizontal abutment surface is perpendicular to the force bearing direction between the upper casing 11 and the lower casing 12, so that even if the upper casing 11 or the lower casing 12 is subject to a large force along the vertical direction of the cover, the protrusion part 111 extending in the horizontal direction can still reliably bear the force, thereby providing a good positioning and support to the sidewall of the lower casing 12. This prevents the sidewall of the lower casing 12 from falling off from the protruding part 111 or being skewed when the cover is subjected to a large force, so that the cover 1 can have better structural strength and load bearing capacity, resulting in higher structural reliability.

The two opposite sides of the inner sidewall 11a of the upper casing 11 are usually provided with the protruding part 111, thereby allowing the protruding part 111 to simultaneously position and fix the opposite sidewalls of the lower casing 12, and resulting in higher connection reliability.

Further, the protruding part 111 may extend along the circumferential direction of the inner sidewall 11a of the upper casing 11. In this case, the protruding part 111 may circumferentially position and restrain the sidewall of the lower casing 12, so that the sidewall of the lower casing 12 may be effectively and reliably fixed.

Further, a bending part (not shown) extending along the vertical direction of the inner sidewall 11a of the upper casing 11 may be provided at both ends of the protruding part 111, and the bending part may extend to the top wall of the upper casing 11, so as to strengthen the stability of the protruding part 111.

In order to further ensure sufficient connection strength between the upper casing 11 and the lower casing 12, optionally, the protruding part 111 protrudes into the accommodating chamber 13 by a length greater than or equal to the thickness of the sidewall of the lower casing 12. In this case, when the sidewall of the lower casing 12 is abutted against the protruding part 111, all parts of the sidewall end surfaces of the lower casing 12 are brought into contact with, and thus supported by, the protruding part 111, enhancing stability and reliability.

Since in a region between the lower part of the protruding part 111 and the bottom end of the upper casing 11, the sidewall of the cover 1 includes two different layers, i.e., the sidewall of the upper casing 11 and the sidewall of the lower casing 12, so that this region of the cover has a thicker wall, which apparently hinders the placement of the electronic components inside the cover. In order to further expand the internal space of the accommodating chamber 13, as an optional implementation, the distance between the protruding part 111 and the top end of the upper casing 11 is longer than the distance between the protruding part 111 and the bottom end of the upper casing 11. At this time, the protruding part 111 is located close to the opening of the chamber of the upper casing 11, so that when the upper casing 11 and the lower casing 12 are butt-joint and welded with each other, the sidewall of the lower casing 12 only extends by a relatively short distance into the inner side of the sidewall of the upper casing 11. Thus, only that short distance along the sidewall of the upper and lower casings is in a overlapped state, and the region with longer distance between the protruding part 111 and the upper end of the upper casing 11 has single layer of casing wall. Thus, the casing wall occupies less space in the accommodating chamber 13, which facilitates the placement of the electronic components inside the cover 1, and further reduces the thermal resistance of the cover and improves the heat dissipation capability.

Optionally, the cover 1 may further include a filling layer (not shown). The filling layer may be disposed on the inner sidewall 11a of the upper casing 11 between the protruding part 111 and the top of the upper casing 11, so as to assist in heat dissipation for the electronic components in the accommodating chamber 13, reduce the thermal resistance of the cover 1, and prevent excessively high internal temperature of the cover 1 from affecting the normal operation of the electronic components.

Further, in order to allow the filling layer of the cover 1 to have better heat dissipation effect, the filling layer may be a metal layer. Due to the better thermal conductivity of the metal, the heat in the accommodating chamber 13 can be quickly conducted to the outside of the cover, thereby effectively reducing the overall thermal resistance of the power adapter. It should be understood that the filling layer of the present disclosure is not limited to the metal layer, and other material layers with desirable heat dissipation effects should all fall within the scope of the present disclosure.

Embodiment 2

Figure 4:
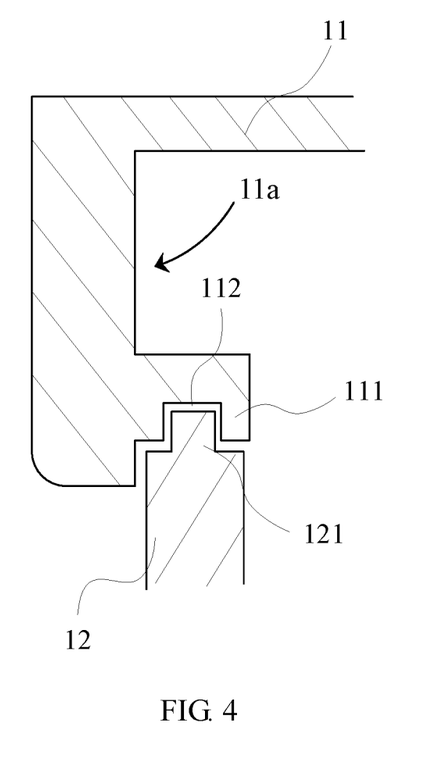
FIG. 4 is a partial schematic structural view of a power adapter according to Embodiment 2 of the present disclosure.

FIG. 4 is a partial schematic structural view of a power adapter according to Embodiment 2 of the present disclosure. In this embodiment, in order to facilitate the ultrasonic welding between the upper and lower casings, a structure such as a weld line is further provided at the joint between the upper casing and the lower casing for facilitating ultrasonic welding. As shown in FIG. 4, based on the above Embodiment 1, in the power adapter of the present embodiment, the lower surface of the protruding part 111 of the upper casing 11 is provided with a groove 112, and the corresponding sidewall of the lower casing 12 is provided with a rib 121. The groove 112 and the rib 121 are fitted and then welded together by ultrasonic wave.

Specifically, in this embodiment, the cover 1 still includes components such as the upper casing 11 and the lower casing 12. The inner sidewall 11a of the upper casing 11 is provided with a protruding part 111. The sidewall of the lower casing 12 may extend into the upper casing 11 and abuts against the protruding part 111 to complete the relative positioning between the upper and lower casings. In order to facilitate the ultrasonic welding, the joint between the upper and lower casing should have a smaller contact area, so that the joint can be quickly heated and welded under the action of ultrasonic vibration. A groove 112 may be disposed on a lower surface of the protruding part 111 of the upper casing 11, i.e., the surface of the protruding part 111 facing the lower casing 12, while a rib 121 may be disposed on a corresponding sidewall of the lower casing 12. Thus, the rib 121 can mesh with the groove 112 and extend into the groove 112. The rib 121 and the groove 112 can be considered as tip portions of the cover 1 when the ultrasonic wave is applied to the cover 1. Therefore, the energy of the ultrasonic vibration is most volatile on the rib 121 and the groove 112, which effectively promotes the melting and welding between the two. Specifically, the rib 121 on the lower casing 12 can be generally located on the end surface of the sidewall of the lower casing 12, that is, the side of the sidewall facing the protruding part 111. Thus, the groove 112 is opposite to the rib 121, allowing accurate mutual fit, which can ensure the reliability of ultrasonic welding.

The length direction of the rib 121 can be the same as the extension direction of the protruding part 111, and both extend along the inner sidewall 11a of the upper casing 11. Correspondingly, the extension direction of the groove 112 can be the same as the extension direction of the rib 121, thereby ensuring mutual fit with the rib 121.

It should be noted that the cross-sectional shape perpendicular to the extension direction of the rib 121 and the groove 112 may be rectangular, trapezoidal, or other cross-sectional shapes commonly used by those skilled in the art, as long as the cross-sectional shape of the rib 121 and the groove 112 allows mutual fitting and facilitates ultrasonic welding between the two, and will not be limited herein.

In addition, other structures and components of the power adapter in this embodiment may be similar or identical to those of the power adapter in the above Embodiment 1, and may implement the same functions as those of the power adapter in Embodiment 1, which will not be repeated herein.

Embodiment 3

Figure 5:
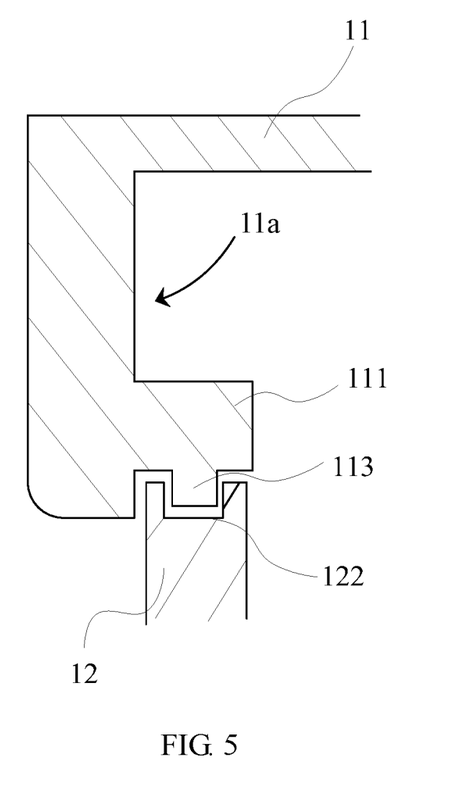
FIG. 5 is a partial schematic structural view of a power adapter according to Embodiment 3 of the present disclosure.

FIG. 5 is a partial schematic structural view of a power adapter according to Embodiment 3 of the present disclosure. As shown in FIG. 5, similar to the foregoing Embodiment 2, in this embodiment, in order to facilitate the ultrasonic welding between the upper and lower casings, a structure such as a weld line is again further provided at the joint between the upper casing and the lower casing for facilitating ultrasonic welding. But unlike the above Embodiment 2, in the cover 1 of the power adapter of the present embodiment, the lower surface of the protruding part 111 of the upper casing 11 is provided with a rib 113, and the corresponding sidewall of the lower casing 12 is provided with a groove 122. The groove 122 and the rib 113 are fitted and then welded together by ultrasonic wave.

Specifically, in this embodiment, the cover 1 still includes components such as the upper casing 11 and the lower casing 12. The inner sidewall 11a of the upper casing 11 is provided with a protruding part 111. The sidewall of the lower casing 12 may extend into the upper casing 11 and abuts against the protruding part 111 to complete the relative positioning between the upper and lower casings. Additionally, the protruding part 111 and the sidewall of the lower casing 12 are respectively provided with structures, such as ribs and grooves, being capable of fitting with each other. Unlike the previous Embodiment 2, the rib 113 is disposed on the lower surface of the protruding part 111 of the upper casing 11 instead of being disposed on the sidewall of the lower casing 12, while the groove 122 corresponding to the rib 113 is disposed on a corresponding sidewall of the lower casing 12. Thus, the rib 113 can also fit with the groove 122 and extend into the groove 122, and the rib 113 and the groove 122 can be considered as tip portions of the cover 1, allowing for melting and welding under the action of ultrasonic wave. Specifically, the groove 122 in the lower casing 12 can be generally located on an end surface of the sidewall of the lower casing 12, that is, the side of the sidewall facing the protruding part 111. In this case, the opening of the groove 122 faces upwards, allowing fitting with the rib 113 protruding downward, as well as accurate mutual fit.

Similar to the previous Embodiment 2, the length direction of the rib 113 can be the same as the extension direction of the protruding part 111, and both extend along the inner sidewall 11a of the upper casing 11. Correspondingly, the groove 122 can also extend along the same direction as the rib 113, thereby ensuring mutual fit with the rib 113.

Optionally, the cross-sectional shape perpendicular to the extension direction of the rib 113 and the groove 122 may also be rectangular, trapezoidal, or other cross-sectional shapes commonly used by those skilled in the art, as long as the cross-sectional shape of the rib 113 and the groove 122 allows mutual fitting and facilitates ultrasonic welding between the two, and will not be limited herein.

In addition, other structures and components of the power adapter in this embodiment may be similar or identical to those of the power adapter in the above Embodiment 1, and may implement the same functions as those of the power adapter in Embodiment 1, which will not be repeated herein.

Embodiment 4

Figure 6:
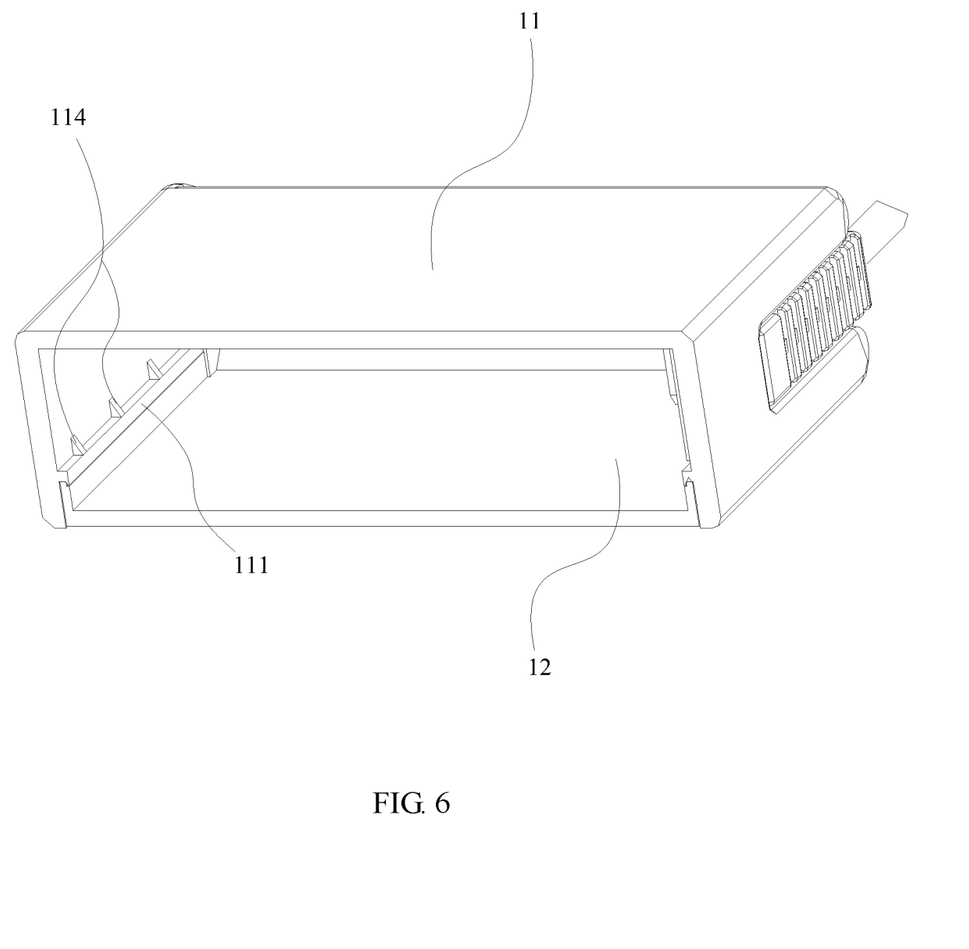
FIG. 6 is a schematic structural view of a power adapter according to Embodiment 4 of the present disclosure.

FIG. 6 is a schematic structural view of a power adapter according to Embodiment 4 of the present disclosure. As shown in FIG. 6, the main structure, function and operational principle of the power adapter in this embodiment are similar to those in the foregoing Embodiments 1-3, which will not be repeated herein. The difference is that, in this embodiment, the upper surface of the protruding part 111 is further provided with a reinforcing rib 114 for reinforcing the protruding part 111.

Specifically, the protruding part 111 needs to bear the force from the sidewall of the lower casing 12 when the upper casing 11 and the lower casing 12 are joined. Therefore, in order to prevent the protruding part 111 from being damaged or collapsing due to excessive pressure from the acting force, the protruding part 111 needs higher structural strength. In order to avoid increasing the thickness of the protruding part 111, a reinforcing rib 114 may be disposed on an upper surface of the protruding part 111, that is, a surface facing away from the sidewall of the lower casing 12. The reinforcing rib 114 may form an auxiliary support point above the protruding part 111, so as to strengthen the overall structural strength of the protruding part.

Considering that the protruding part 111 extends along the inner sidewall 11a of the upper casing 11, as an optional implementation, the reinforcing ribs 114 may be disposed at intervals on the upper surface of the protruding part 111. In this case, the reinforcing ribs 114 may be distributed at different locations of the protruding part 111 to provide reinforcement and auxiliary support for the protruding part 111 over the range of extension of the protruding part 111.

The specific shape, thickness and the like of the reinforcing rib 114 may be of any shape and parameter that are well known to those skilled in the art, which will not be repeated herein.

It should be noted that, in the above embodiments, the connection between the upper casing and the lower casing is made by ultrasonic welding, but the disclosure is not limited thereto, and any other means capable of connecting and fixing the two shall fall within the scope of the present disclosure, such as adhered together with glue and the like.

Finally, it should be noted that the foregoing embodiments are merely intended for describing, rather than limiting, the technical solutions of the present disclosure. Although the present disclosure is described in detail with reference to the foregoing embodiments, persons of ordinary skill in the art should understand that it remains possible to make modifications to the technical solutions described in the foregoing embodiments, or make equivalent replacements to some or all technical features therein. However, these modifications or replacements do not make the essence of corresponding technical solutions depart from the scope of the technical solutions in the embodiments of the present disclosure.

What is claimed is:

1. A power adapter, comprising:
   a cover, comprising:
   an upper casing, wherein an inner sidewall of the upper casing is provided with a protruding part; and
   a lower casing, fitting with the upper casing to form an accommodating chamber, wherein a sidewall of the lower casing fits with the protruding part to connect them together, and the sidewall of the lower casing abuts against a lower surface of the protruding part, an upper surface of the protruding part contacts with the accommodating chamber; and
   electronic components, disposed within the accommodating chamber.

2. The power adapter according to claim 1, wherein a lower surface of the protruding part is provided with a groove, and a corresponding sidewall of the lower casing is provided with a rib, wherein the groove and the rib are fitted and then connected together.

3. The power adapter according to claim 1, wherein a lower surface of the protruding part is provided with a rib, and a corresponding sidewall of the lower casing is provided with a groove, wherein the groove and the rib are fitted and then connected together.

4. The power adapter according to claim 1, wherein the protruding part extends along a horizontal direction of the inner sidewall of the upper casing.

5. The power adapter according to claim 1, wherein both ends of the protruding part are provided with a bending portion which extends vertically along the inner sidewall of the upper casing.

6. The power adapter according to claim 1, wherein a distance between the protruding part and a top end of the upper casing is longer than a distance between the protruding part and a bottom end of the upper casing.

7. The power adapter according to claim 1, wherein the upper surface of the protruding part is provided with one or more reinforcing ribs.

8. The power adapter according to claim 7, wherein the reinforcing ribs are provided at intervals on the upper surface of the protruding part.

9. The power adapter according to claim 1, wherein the protruding part protrudes into the accommodating chamber by a length greater than or equal to a thickness of the sidewall of the lower casing.

10. The power adapter according to claim 1, wherein the cover further comprises a filling layer, which is provided on the inner sidewall of the upper casing between the protruding part and a top end of the upper casing.

11. The power adapter according to claim 10, wherein the filling layer is a metal layer.

12. The power adapter according to claim 1, wherein the upper casing is made of plastic material.

13. The power adapter according to claim 1, wherein the lower casing is made of plastic material.

14. The power adapter according to claim 1, wherein the sidewall of the lower casing and the protruding part are welded to connect together by ultrasonic wave.

15. The power adapter according to claim 1, wherein the sidewall of the lower casing and the protruding part are adhered to connect together with glue.

16. The power adapter according to claim 1, wherein a side surface of the protruding part close to the accommodating chamber contacts with the accommodating chamber.

* * * * *